United States Patent
Grewal et al.

(10) Patent No.: US 12,194,988 B2
(45) Date of Patent: Jan. 14, 2025

(54) SYSTEMS AND METHODS FOR COMBINING DETECTED OBJECTS

(71) Applicant: GM GLOBAL TECHNOLOGY OPERATIONS LLC, Detroit, MI (US)

(72) Inventors: Amanpal S Grewal, Novi, MI (US); Michael Trotter, Royal Oak, MI (US); Ibrahim Riba, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 420 days.

(21) Appl. No.: 17/657,739

(22) Filed: Apr. 1, 2022

(65) Prior Publication Data
US 2023/0311858 A1 Oct. 5, 2023

(51) Int. Cl.
| | |
|---|---|
| *B60W 30/09* | (2012.01) |
| *B60W 10/04* | (2006.01) |
| *B60W 10/18* | (2012.01) |
| *B60W 10/20* | (2006.01) |
| *B60W 30/095* | (2012.01) |
| *B60W 40/04* | (2006.01) |
| *G01S 7/41* | (2006.01) |
| *G01S 13/931* | (2020.01) |
| *G06V 10/82* | (2022.01) |
| *G06V 20/58* | (2022.01) |

(52) U.S. Cl.
CPC ............ *B60W 30/09* (2013.01); *B60W 10/04* (2013.01); *B60W 10/18* (2013.01); *B60W 10/20* (2013.01); *B60W 30/0956* (2013.01); *B60W 40/04* (2013.01); *G01S 7/417* (2013.01); *G01S 13/931* (2013.01); *G06V 10/82* (2022.01); *G06V 20/58* (2022.01); *B60W 2420/403* (2013.01); *B60W 2420/408* (2024.01); *B60W 2554/4023* (2020.02); *B60W 2554/802* (2020.02); *B60W 2554/804* (2020.02); *G01S 2013/9318* (2020.01); *G01S 2013/93185* (2020.01); *G01S 2013/93271* (2020.01)

(58) Field of Classification Search
None
See application file for complete search history.

(56) References Cited

U.S. PATENT DOCUMENTS

| | | | |
|---|---|---|---|
| 12,039,784 B1 * | 7/2024 | Costantino | G06V 20/56 |
| 2021/0179123 A1 * | 6/2021 | Yamada | B60T 7/12 |
| 2023/0192146 A1 * | 6/2023 | Imran | G01S 13/931 |
| | | | 701/28 |
| 2023/0273308 A1 * | 8/2023 | John Wilson | G01S 7/4802 |
| | | | 342/104 |

* cited by examiner

*Primary Examiner* — Aniss Chad
*Assistant Examiner* — Jennifer M Anda
(74) *Attorney, Agent, or Firm* — Lorenz & Kopf LLP (57) ABSTRACT

Systems and methods of controlling an active safety feature of a vehicle are provided. The systems and methods receive radar data from a radar device of the vehicle and image data from a camera of the vehicle. Object detection and tracking processes are performed on the radar data and the image data to identify and track objects in an environment of the vehicle. Conditions are assessed with respect to identified objects to ascertain whether a radar track is erroneously reported as a separate object to a camera track. When the conditions are assessed to be true, an object corresponding to the camera track is used as an input for controlling an active safety feature of the vehicle and an object corresponding to the radar track is discounted for controlling the active safety feature of the vehicle.

20 Claims, 6 Drawing Sheets

SYSTEMS AND METHODS FOR COMBINING DETECTED OBJECTS

The present disclosure generally relates to vehicles, systems and methods for detecting and tracking objects.

INTRODUCTION

Object detection systems, also known as object sensing systems, have become increasingly common in modern vehicles. Object detection systems can provide a warning to a driver about an object in the path of a vehicle. Object detection systems can also provide input to active vehicle safety systems, such as Adaptive Cruise Control (ACC), which controls vehicle speed to maintain appropriate longitudinal spacing to a leading vehicle. Other active safety features that rely on object detection and tracking include Collision Imminent Braking (CIB), which applies braking without driver input when the object detection system determines that a collision is imminent.

Object detection systems use one or more sensors, which may be radar, lidar, camera, or other technologies, to detect the presence of an object in or near the path of a host vehicle. Software is used to track the relative motion of objects over time, determine if the objects are moving or stationary, determine what each object is likely to be (another vehicle, a pedestrian, a tree, etc.), and determine whether each object poses a collision threat to the host vehicle.

Autonomous and semi-autonomous vehicles are capable of sensing their environment and navigating based on the sensed environment. Such vehicles sense their environment using sensing devices such as radar, lidar, image sensors, and the like. The vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, lane keeping control and parking assistance systems correspond to lower automation levels, while true "driverless" vehicles correspond to higher automation levels.

It has been found that a radar object detection system can errantly report two radar tracks (two separate objects are reported) for a single long vehicle and the more forward radar track can sometimes have a motion vector erroneously impinging on the path of the host vehicle. This can result in an active safety feature being activated, such as an advance braking assist system, when the active safety feature should not, in fact, be engaged.

Accordingly, it is desirable to provide systems and methods that determine when an object is being erroneously reported as a separate object and avoid activating an active safety feature based on such an erroneous report. Furthermore, other desirable features and characteristics of the present invention will become apparent from the subsequent detailed description and the appended claims, taken in conjunction with the accompanying drawings and the foregoing technical field and background.

SUMMARY

In one aspect, a method of controlling an active safety feature of a vehicle is provided. The method includes receiving, via at least one processor, radar data from a radar device of the vehicle, receiving, via the at least one processor, image data from a camera of the vehicle, performing, via the at least one processor, object detection and tracking processes on the radar data and the image data to identify and track objects in an environment of the vehicle, and assessing, via the at least one processor, the following conditions. A first and a second object are detected by the object detection and tracking processes. The first object is located longitudinally in front of the second object by a substantially constant distance; and the object detection and tracking processes produces a radar track for the first object and does not produce a camera track for the first object. When the conditions are assessed to be true, using, via the at least one processor, the second object as an input for controlling an active safety feature of the vehicle and discounting the first object as an input for controlling the active safety feature of the vehicle.

In embodiments, the conditions further include: the object detection and tracking processes classifying the second object as a large vehicle type.

In embodiments, the conditions further include: the object detection and tracking processes identifying the second object as having a specified minimum width.

In embodiments, the conditions further include: object detection and tracking processes determining a longitudinal velocity for the first object that is substantially the same as a longitudinal velocity for the second object.

In embodiments, the conditions further include: the object detection and tracking processes producing a radar track and a camera track for the second object.

In embodiments, the conditions further include: the first object being located longitudinally in front of the second object within a set distance.

In embodiments, the object detection and tracking processes include object detecting using a deep learning algorithm.

In embodiments, the active safety feature includes change in motion of the vehicle in response to an object being predicted by the at least one processor to interfere with a path of the vehicle. In embodiments, the change in motion is affected by braking, steering or propulsion control.

In embodiments, the camera and the radar device are forward facing.

In another aspect, a vehicle is provided. The vehicle includes: an active safety system, a radar device, a camera and at least one processor in operable communication with the active safety system, the radar device and the camera. The at least one processor is configured to execute program instructions. The program instructions are configured to cause the at least one processor to: receive radar data from a radar device of the vehicle, receive image data from a camera of the vehicle, perform object detection and tracking processes on the radar data and the image data to identify and track objects in an environment of the vehicle, and assess the following conditions. A first and a second object are detected by the object detection and tracking processes, the first object is located longitudinally in front of the second object by a substantially constant distance, the object detection and tracking processes produces a radar track for the first object and does not produce a camera track for the first object, and when the conditions are assessed to be true, use the second object as an input for controlling an active safety feature of the vehicle and discount the first object as an input for controlling the active safety feature of the vehicle.

In embodiments, the conditions further include: the object detection and tracking processes classifying the second object as a large vehicle type.

In embodiments, the conditions further include: the object detection and tracking processes identifying the second object as having a specified minimum width.

In embodiments, the conditions further include: object detection and tracking processes determining a longitudinal velocity for the first object that is substantially the same as a longitudinal velocity for the second object.

In embodiments, the conditions further include: the object detection and tracking processes producing a radar track and a camera track for the second object.

In embodiments, the conditions further include: the first object being located longitudinally in front of the second object within a set distance.

In embodiments, the object detection and tracking processes include object detecting using a deep learning algorithm.

In embodiments, the active safety feature includes change in motion of the vehicle in response to an object being predicted by the at least one processor to interfere with a path of the vehicle.

In embodiments, the change in motion is affected by braking, steering or propulsion control.

In embodiments, the camera and the radar device are forward facing.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods described herein address instances when a radar device reports more than one object while passing long vehicles (e.g. a truck). This erroneous reporting of another radar track for a single vehicle could result in the host vehicle automatic braking as a determination is made that the more forward radar track is on course to impinge with a path of the host vehicle. The systems and methods disclosed herein assess the following conditions to determine whether a first detected object should be considered as part of a second detected object: whether a radar object track corresponding to a first detected object is not co-located with a camera object track, the first detected object is located within a specified distance of the second detected object, the longitudinal distance between the first and second objects is substantially constant, and the second detected object is classified as a large vehicle (e.g. a truck). When these conditions are determined to be met, the first and second objects are combined and considered as a single unit for controlling an active safety feature of the host vehicle.

Systems and methods described herein address an issue whereby radar devices (Long Range and/or Short Range) provide multiple returns from semi-truck trailers and other such large vehicles. The radar device may provide a return identifying a rear of the vehicle as well as a return for the front cab/axle area. Because these returns are sufficiently far apart, they are treated as separate objects by object fusion. Adjacent lane large targets like this generating two (or more) radar return measurements can lead to the front return errantly reporting that it is effectively placed in the host vehicle path. This can result in an unexpected, and potentially severe, braking event as the front part of the large adjacent vehicle radar return is considered a unique target that is in the host lane. The systems and methods described herein recognize and prohibit unintended braking events in this type of scenario.

Systems and methods described herein recognize that a radar return, that has been treated as a unique object, is indeed a part of an existing object track. To obtain that recognition, a multifactor rationality is applied. A suspect radar only track is discounted for use by an active safety feature (e.g. ACC, Forward Collision Avoidance (FCA), CM, etc.) if all of the following conditions are met: a radar track is not confirmed by camera detection, the radar track is located longitudinally in front (within a calibrated threshold) of a confirmed camera and radar target that is classified as a large vehicle based on object type determination and also has a minimum detected vehicle width, the suspect radar track has the same longitudinal velocity as the confirmed preceding radar/camera target within a calibration, and the suspect radar track maintains a constant (within a calibration) longitudinal position difference between itself and preceding radar/camera target. When the above conditions are met, the suspect radar return is considered to be a part of the preceding established camera/radar target and thereby forms a "virtual chassis" that allows the entire unit to be considered as one. Further, the camera reporting of object length could also be used to further confirm that suspect radar return is indeed a part of a large vehicle. Using this strategy will still allow separate vehicles to be identified and reacted to individually, as expected. Separate vehicles travelling together would not be detected in this multifactor rationality since longitudinal position differences of both targets will not remain constant. As a result, the "virtual chassis" conditions will not be met.

Figure 1:
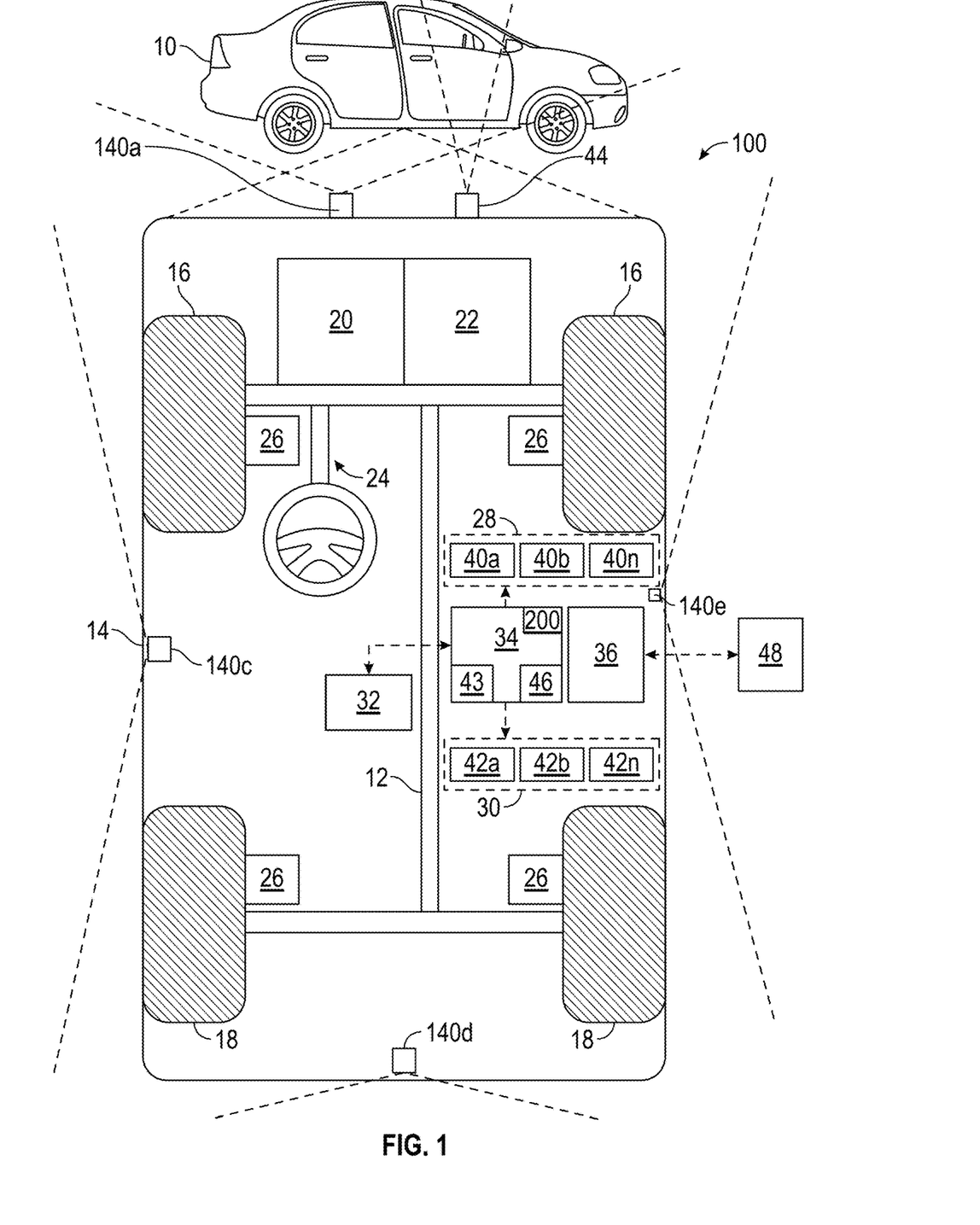
FIG. 1 is a functional block diagram illustrating an autonomous or semi-autonomous vehicle system utilizing an object combining system, in accordance with various embodiments.

With reference to FIG. 1, a vehicle system shown generally at 100 is associated with a vehicle 10 in accordance with various embodiments. In general, the vehicle system 100 includes an object combining system 200. The object combining system 200 determines when a radar object track that is located in front of a combined camera and radar object track is likely to be part of the same target vehicle.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the vehicle 10 is an autonomous vehicle and the object combining system 200 is incorporated into the autonomous vehicle 10 (hereinafter referred to as the autonomous vehicle 10). The present description concentrates on an exemplary application in autonomous vehicle applications. It should be understood, however, that the object combining system 200 described herein is envisaged to be used in semi-autonomous automotive vehicles. In particular, the object combining system 200 has utility in association with driver assistance systems such as adaptive cruise control and collision avoidance systems.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. However, the vehicle 10 may also be characterized as being lower level automation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 140a-140n, thermal cameras, ultrasonic sensors, and/or other sensors. The optical cameras 140a-140n are mounted on the vehicle 10 and are arranged for capturing images (e.g. a sequence of images in the form of a video) of an environment surrounding the vehicle 10. In the illustrated embodiment, there is a front facing optical camera 140a. In other embodiments, first and second front facing optical cameras are arranged for respectively imaging a wide angle, near field of view and a narrow angle, far field of view. Further illustrated are left-side and right-side cameras 140c, 140e and a rear camera 140d, which are optional features of the vehicle 10. The number and position of the various cameras 140a-140n is merely exemplary and other arrangements are contemplated. The camera 140a is a device capable of translating visual inputs in the form of light, infrared, or other electro-magnetic (EM) radiation into a data format readily capable of analysis, e.g., a digital, pixelated image. In one embodiment, the camera 140a uses a charge coupled device (CCD) sensor to generate images indicating a field-of-view. Preferably, the camera 140a is configured for continuous image generation, e.g., 30 images generated per second. Images generated by the camera 140a may be stored in memory within the camera or transferred to the controller 34 for storage and/or analysis. Preferably, each image generated by the camera 140a is a two-dimensional image of known pixel dimensions comprising a plurality of identifiable pixels. The plurality of identifiable pixels may be stored and analyzed using an array. Each pixel may be represented in the array as a set of bits or a plurality of sets of bits wherein the bits correspond to a color on a predetermined palette or color map. Each pixel may be expressed as a function of a plurality of color intensity values such as in a red-green-blue (RGB) color model or a cyan-magenta-yellow-key (CMYK) color model.

Preferably, each pixel comprises a plurality of sets of bits wherein each set of bits corresponds to a color intensity and a color intensity value e.g., a first set of bits corresponds to a red color intensity value, a second set of bits corresponds to a green color intensity value, and a third set of bits corresponds to blue color intensity value on the RGB color model.

Further illustrated is a front facing radar device 44. Although only one front facing radar device is shown in the exemplary embodiment, first and second front facing radar devices may be provided that are respectively long and short range radars. Further radar devices may be included that are distributed around the vehicle. The radar device 44 may be specifically configured for providing an input to driver assistance systems, such as adaptive cruise control and collision warning and thus is a long range radar device. The radar device 44 may be capable of detecting and recognizing objects at a range of up to 250 meters. The radar device 44 is suitable for providing radio frequency signals that can be used to determine a distance and/or a relative velocity of various objects with respect to the vehicle 10. The radar device 44 includes a transmitter and a receiver or a MIMO (multi-input, multi-output) radar device 44 is provided that includes an array of transmitters and an array of receivers. The radar device 44 is controlled to generate a radio frequency wave front, which may be a linear frequency-modulated continuous wave (LFM-CW), often referred to as a chirp signal. Alternately, a pulsed signal or a combination of pulsed and chirp signals are generated. The radio frequency signal is reflected off of various objects in the environment of the vehicle 10. Each of these objects generates a reflected signal in response to receiving the transmitted signal. The radar device 44 includes a processor (not shown) for transferring the reflected waves into a data format capable of analysis, indicating for example range and angle from the objects off which the waves reflected. Further processing allows velocity and position of reflecting surfaces to be revealed.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 43 and a computer readable storage device or media 46. The processor 43 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 43 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 43, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the object combining system 200 and, when executed by the processor 43, are configured to implement the methods and systems described herein for determining a potentially erroneous radar object track that is separate from a camera and radar object track but which should actually be deemed part of the same object, namely a large vehicle. Various conditions are assessed to determine whether the detected object tracks should be combined in that the radar object track is debounced as an input to an active safety feature control module.

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

As can be appreciated, the subject matter disclosed herein provides certain enhanced features and functionality to what may be considered as a standard or baseline autonomous vehicle 10. To this end, an autonomous vehicle can be modified, enhanced, or otherwise supplemented to provide the additional features described in more detail below. The subject matter described herein concerning the object combining system 200 is not just applicable to autonomous driving applications, but also other driving systems having one or more automated features utilizing object detection to control an active safety feature based on radar and camera inputs.

Figure 2:
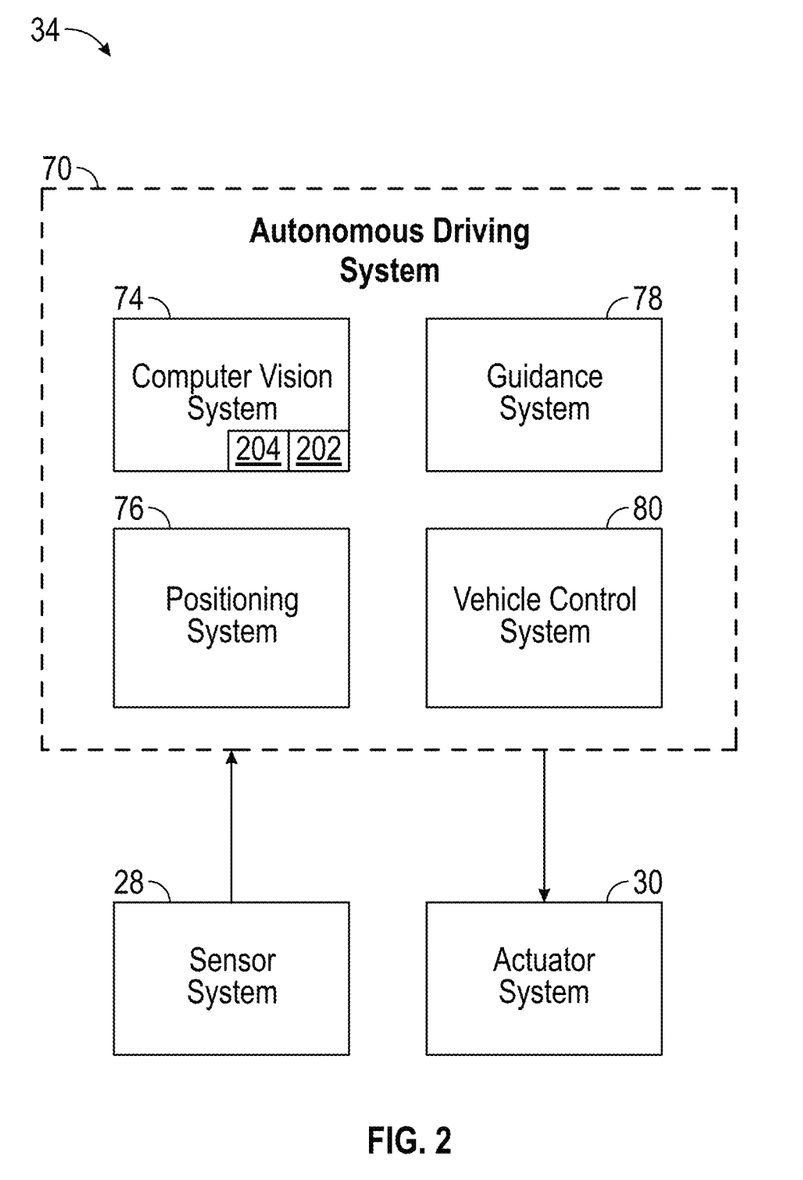
FIG. 2 is a diagram illustrating an autonomous driving system that includes an object combing system, in accordance with various embodiments.

In accordance with an exemplary autonomous driving application, the controller 34 implements an autonomous driving system (ADS) 70 as shown in FIG. 2. That is, suitable software and/or hardware components of the controller 34 (e.g., the processor 43 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. With additional reference to FIG. 3, the computer vision system 74 additionally includes an object detection and tracking module 202 and a conditions assessment module 204 of the object combining system 200.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path. The positioning system 76 may process a variety of types of raw localization data in determining a location of the vehicle 10 including Inertial Measurement Unit data, Global Positioning System (GPS) data, Real-Time Kinematic (RTK) correction data, cellular and other wireless data (e.g. 4G, 5G, V2X, etc.), etc.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the object combining system 200 of FIG. 1 (and FIG. 3) is included within the ADS 70 in autonomous driving applications, for example in operable communication with the computer vision system 74, the positioning system 76, the guidance system 78 and the vehicle control system 80. The object combining system 200 is part of the computer vision system 74 in that the computer vision system 74 including the object combining system 200 receives radar data 212 and image data 208 from the radar device 44 and the camera 140, respectively, detects and tracks objects and determines whether any of those objects should be combined by assessing conditions that are discussed further herein.

Figure 3:
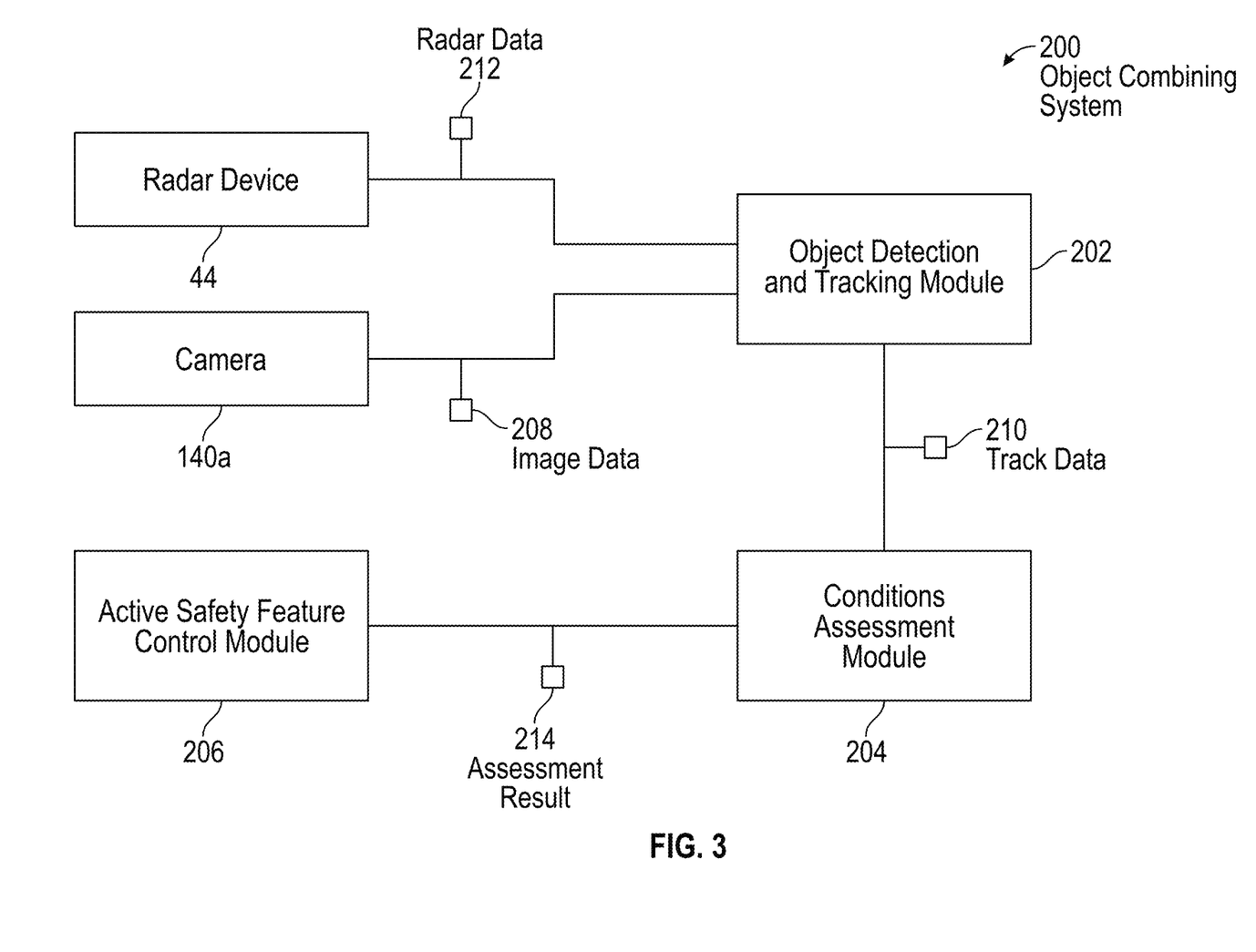
FIG. 3 is a system diagram illustrating functional blocks for an object combining system, in accordance with various embodiments.

Referring to FIG. 3, with continued reference to FIGS. 1 and 2, the object combining system 200 is further illustrated in accordance with exemplary embodiments. The object combining system 200 includes functional modules that are performed by the programming instructions described hereinbefore and other system components. The object combining system 200 includes at least one camera 140a, the radar device 44, an object detection and tracking module, a conditions assessment module 204 and an active safety feature control module 206.

As discussed further herein, the one or more camera(s) 140a are imaging devices that provide image data representing a digital version of an environment around the vehicle 10. The image data is provided in the form of a sequence of frames at a frame rate of the one or more camera(s). As described with respect to FIG. 1, the one or more camera(s) 140a may be forward seeing. The image data 142 includes images of other traffic vehicles (or target vehicles). For example, when the vehicle 10 is travelling along a road, the image data may image another vehicle in the viewable external environment of the vehicle 10.

As discussed further herein, the radar device 44 provides radar data 212 representing a digital version of the an environment around the vehicle 10 based on radar reflections from objects. The radar data 212 is provided in the form of doppler and range information, which is representative of a relative distance and velocity of the object from which the reflection came. The radar device 44 may be forward facing.

The image data 208 and the radar data 212 is provided to an object detection and tracking module 202, which may be included as part of the computer vision system 74 (FIG. 2). The object detection and tracking module 202 may be embodied in a variety of ways to identify and describe, among other optical targets of interest, location, classification and velocity of other vehicles. For example, a neural network, such as a convolutional neural network, can be trained to identify the state of the target objects. Accordingly, the object detection and tracking module 202 includes artificial intelligence for detecting and extracting features describing target vehicles in an environment around the vehicle 10. The artificial intelligence can be implemented with techniques, such as machine learning, deep learning, a neural network, a convolutional neural network (e.g., a ConvNet), a recurrent neural network, random forests, genetic algorithms, and reinforcement learning. The object detection and tracking module 202 can output track data 210 including features describing any detected target objects including such features as location, size (e.g. width and length), classification, velocity, motion trend, etc. The track data 210 is time varying in that it changes as new frames of image data 208 and radar data 212 are provided.

The object detection and tracking module 202 may include a sensor fusion algorithm that fuses object information based on the radar data 212 and the image data 208. In some embodiments, the radar data 212 and the image data 208 is first fused and then object detection and tracking processing is performed or parallel object detection and tracking processing is performed on the radar data 212 and the image data 208 and respective radar object tracks and camera object tracks are fused in the sensor fusion algorithm. Fused positions for each detected and tracked object is included in track data 210. Methods to fuse multiple sets of data into a fused set are known in the art. Exemplary methods can, for instance, apply weights or measured variances in the various data points, and the contribution of each individual point to the fused set can depend upon the weights or variances. As one example, U.S. Pat. No. 7,460,951, entitled SYSTEM AND METHOD OF TARGET TRACKING USING SENSOR FUSION, is hereby incorporated by reference such that the method and apparatus for fusing tracking data from a plurality of sensors need not be fully described in detail herein.

The track data 210 includes a track for each object. A track connects various states S0, . . . , S(k−3), S(k−2), S(k−1) of the object at different time steps (0, . . . , k−1). Each state is represented by its state variables, which includes position and velocity vectors of the object and optionally classification of the object and any other extracted features. The track may additionally include one or more predicted states S(k) at time step k and optionally further times steps (k+1 . . . ). The state variables for the state S(k−1) (and optionally previous states) at time step k−1 can be used to predict state S(k) of the object for time step k. Each is track is monitored and maintained by the object detection and tracking module 202. In some embodiments, tracks are maintained on the basis of radar data 212 and image data 208 separately and in other embodiments, one fused tracked is maintained. The track data 210 will be further described with reference to the illustrative examples of FIGS. 4 and 5.

The conditions assessment module 204 is configured to evaluate a series of conditions on the object tracks included in the track data 210 to determine whether first and second detected objects are likely to be part of the same object. The conditions assessment module 204 outputs an assessment result 214 representing whether first and second objects are part of the same object. First, reference is made to FIG. 4, where an exemplary driving scenario 400 is illustrated as interpreted by the object combining system 200. The host vehicle 10 has a camera 140*a* and a radar device 44 that are forward facing. The camera 140*a* has a camera field of view 412, which is relatively wide, and the radar device 44 has a radar field of view 410, which is relatively narrow. The radar device 44, together with the object detection and tracking module 202, has detected a first radar detected object 402. The object detection and tracking module 202 outputs a radar detected object track that includes a location of the first radar detected object 402, first object predicted motion 406 (which includes a directional motion trend), a velocity vector, a classification of the object and optionally further extracted features. The camera 140*a*, together with the object detection and tracking module 202, has not been able to identify a substantially co-located camera detected object track. As can be seen, the first object predicted motion 406 predicts that the first radar detected object 402 will coincide with the predicted host vehicle path 416, which could activate a collision avoidance active safety feature. It could be that the first radar detected object 402 is a false detection, which would mean that the collision avoidance safety feature is erroneously activated. The camera 140*a* and the radar device 44, together with the object detection and tracking module 202, respectively detect a second camera detected object 414 and a second radar detected object 404. The object detection and tracking module 202 output track data 210 including a camera detected object track and a radar detected object track that each include information including previous states (location and velocity vectors) of the detected object, predicted state of the detected object (as represented by second object predicted motion 408) and object classification. The object may be classified as one of a class of objects including truck (or other long vehicle classification like bus), other types of vehicle (e.g. motorcycle and SUV) and non-vehicle objects like pedestrians and cyclists.

Figure 4:
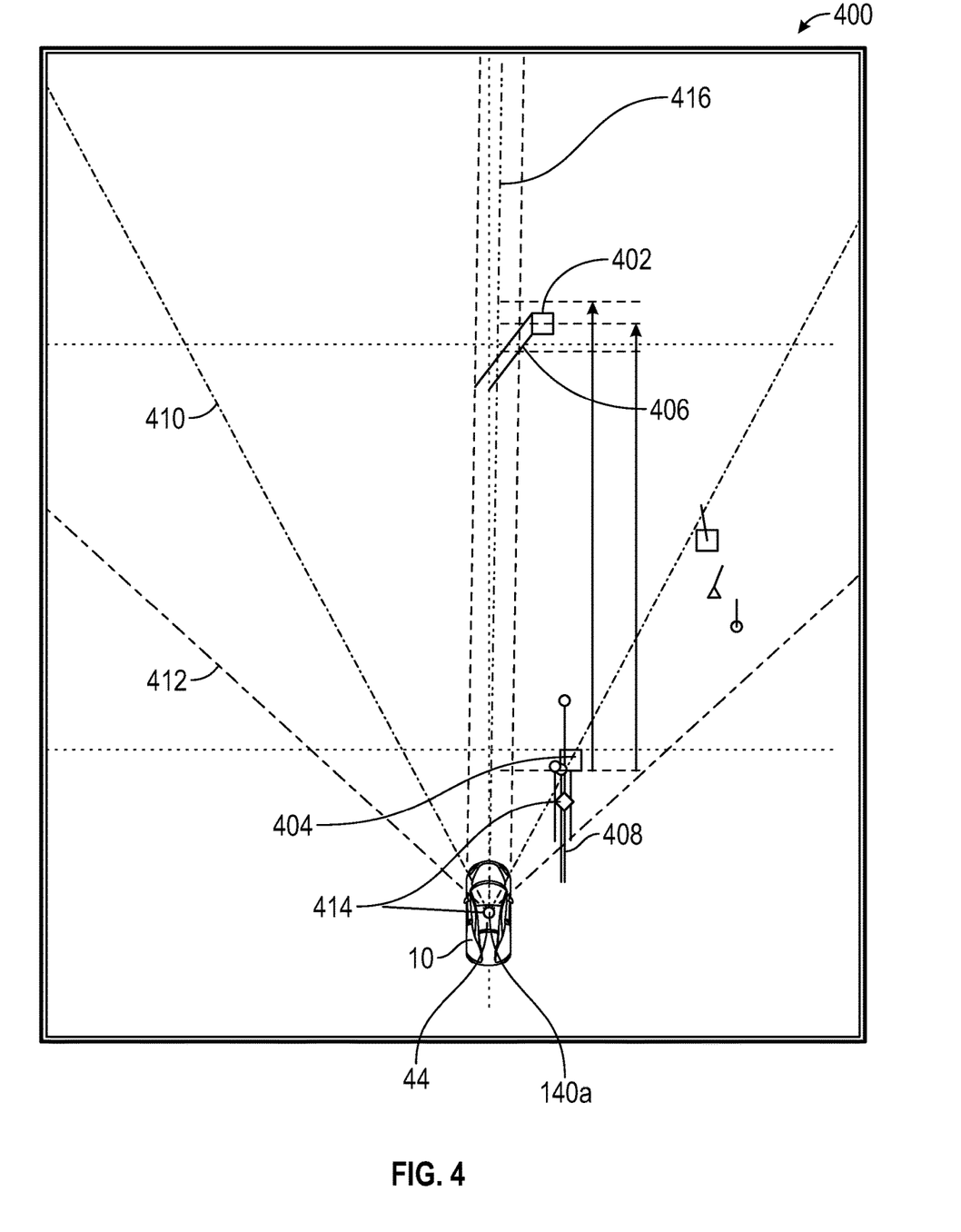
FIG. 4 is a diagram illustrating object detection and tracking where two objects have been detected that are part of the same vehicle, in accordance with various embodiments.

The conditions assessment module 204 applies at least some of the following conditions:

is the first radar detected object 402 not substantially co-located camera detected object?

is the first radar detected object 402 forward of a second radar and/or camera detected object 404, 414?

Has the second radar and/or camera detected object 404, 414 been classified as a long vehicle?

Are the first radar detected object 402 and the second radar detected object 404 separated within a predetermined distance of one another along a longitudinal direction? The predetermined distance is defined by a reasonable assumption of a maximum length of such a long vehicle.

Are the first radar detected object 402 and the second radar detected object 404 separated by a substantially fixed amount?

Are the longitudinal velocity of the first radar detected object 402 and the second radar detected object 404 substantially the same?

Is a width of the second radar detected object 404 and/or the second camera detected object 414 equal to or greater than a predetermined minimum width?

The conditions assessment module 204 can assess the conditions in any order and determine a negative result at a first condition in the order that is not met. When the conditions assessment module 204 determines that those of the above conditions that are applied are each true, the assessment result 214 indicates a positive assessment result 214 that the first radar detected object 402 and the second radar detected object 404 should be considered to be the same object. With additional reference to FIG. 5, a driving scenario 500 is illustrated in which the object combining system 200 has determined that the conditions have been met for the first radar detected object 402 and the second radar and/or camera detected object 404, 414 to be combined and considered as a single unit. This combination can be performed in various ways. In one embodiment, the combination is performed by discounting or ignoring the first radar detected object 402 or its associated track at least as an input to the active safety feature control module 206, which implicitly means that the radar detected object 402 is combined with the second camera detected object 414 and the second radar detected object 404. In another embodiment, a virtual chassis 502 (or bounding box) is formed that encompasses the first radar detected object 402 and the second radar and/or camera detected object 404, 414 and the velocity and motion trend of the virtual chassis 502 is taken from the state values associated with the tracks of the second radar and/or camera detected objects 404, 414.

Figure 5:
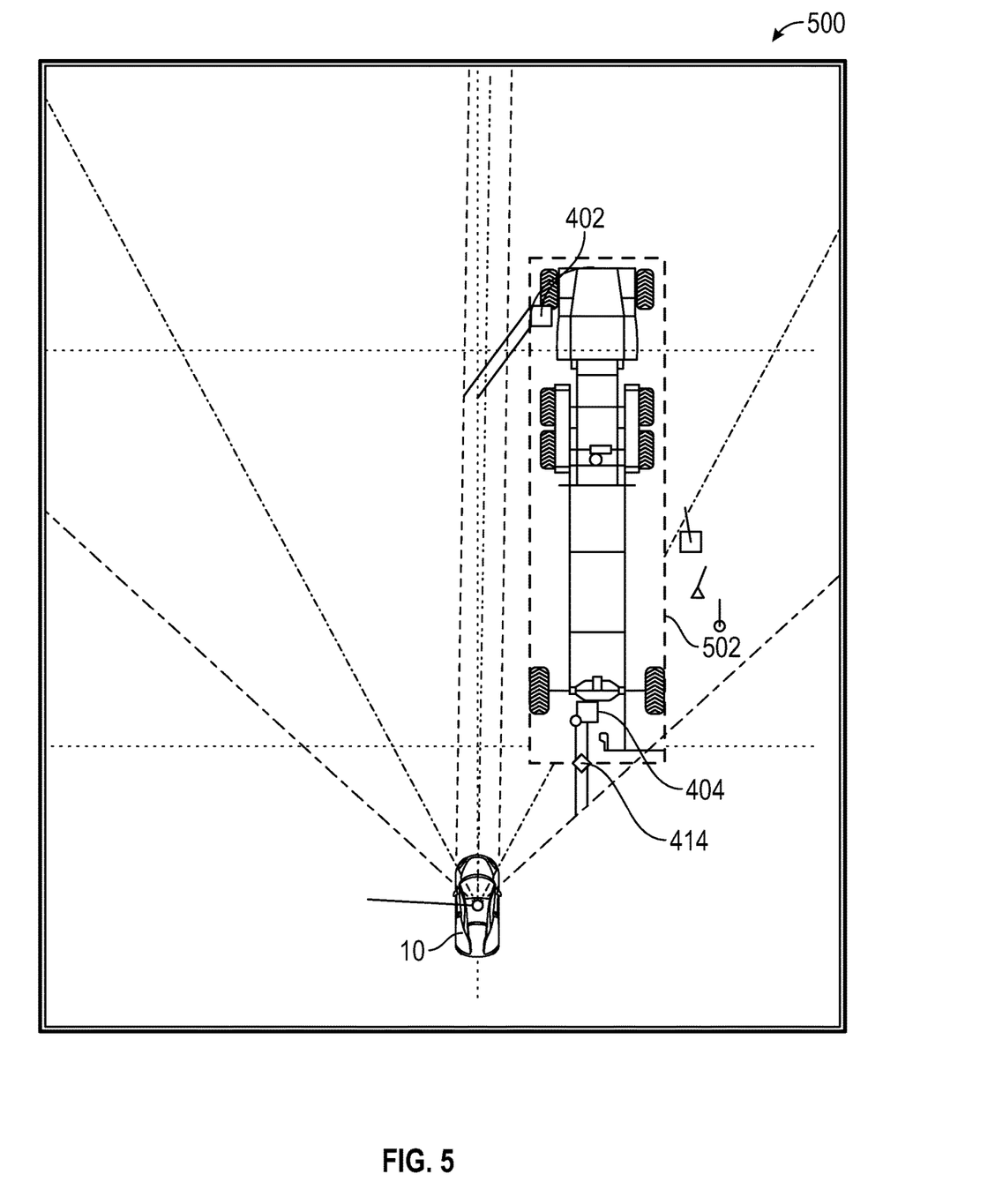
FIG. 5 is a diagram illustrating object detection and tracking where two objects have been combined, in accordance with various embodiments.

The active safety feature control module 206 receives the assessment result 214. When the assessment result is negative, the first radar detected object 402 and the second radar and/or camera detected object 404, 414 are both taken as inputs to the active safety feature control module 206 and the safety features are responsive to both. When the assessment result is positive, the track for first radar detected object 402 is discounted and the second radar and/or camera detected object 404, 414 is taken as an input to the active safety feature control module 206 and the safety features are responsive thereto. The active safety feature can be a collision avoidance feature, a collision warning feature, an adaptive cruise control feature, etc. The active safety feature control module 206 can output commands to control steering, propulsion and/or braking of the vehicle 10 and/or an indicator light, display and/or audible output to the driver of the vehicle 10.

Figure 6:
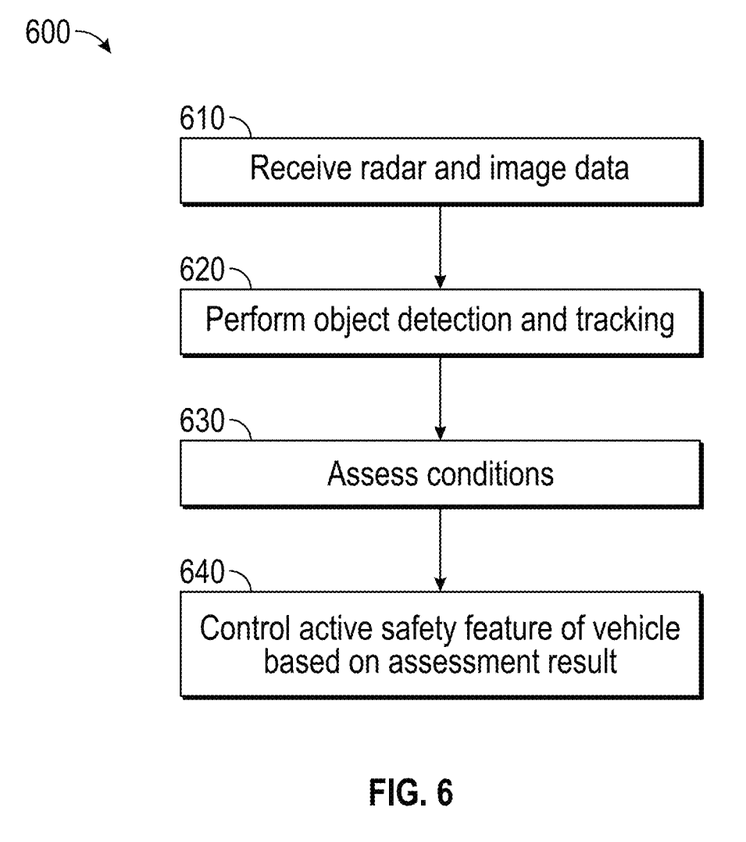
FIG. 6 is a flowchart illustrating method steps of an algorithmic process to combine detected objects, in accordance with various embodiments.

Referring now to FIG. 6, and with continued reference to FIGS. 1-5, a flowchart illustrates a method 600 of combining objects and controlling an active safety feature of a vehicle, in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the method 600 can be scheduled to run based on one or more predetermined events, and/or can run continuously during operation of the autonomous vehicle 10.

In step 610, radar data 212 and image data 208 are received by the object detection and tracking module 202 from the radar device 44 and the camera 140a. The radar data 212 and the image data 208 are digital representations of a forward scene of the vehicle 10 and include any objects within the fields of view 410, 412 of the radar device 44 and the camera 140a.

In step 620, object detection and tracking processes are performed, by the object detection and tracking module 202, on the radar data 212 and the image data 208 to identify and track objects in an environment of the vehicle 10. The object detection and tracking processes includes artificial intelligence detecting and extracting features describing target objects in an environment around the vehicle 10. The artificial intelligence can be implemented with techniques, such as machine learning, deep learning, a neural network, a convolutional neural network, etc. The object detection and tracking processes produce tracks associated with each detected object. These tracks represent connected states of each object at different time steps including a prediction of one or more future time steps. The states can each encompass extracted features such as location and velocity vectors. The object detection and tracking processes further classify the object into a particular type where at least one of those classifications is a long vehicle type (e.g. a truck or a bus). Width and/or length dimension of the object may also be extracted.

The method includes, at step 630, assessing, via the conditions assessment module 204, at least some of the following conditions:
- a first radar detected object 402 corresponding to a first object and a second camera and/or radar detected object 404, 414 are detected by the object detection and tracking processes;
- the second camera detected object 414 and the second radar detected object 404 are co-located and thus correspond to a second object. In some embodiments, these detections are fused;
- the first object is located longitudinally in front of the second object by a substantially constant distance;
- the object detection and tracking processes produce a radar track for the first object and does not produce a camera track for the first object;
- the object detection and tracking processes classify the second object as a large vehicle type;
- the object detection and tracking processes identifying the second object as having a specified minimum width;
- the object detection and tracking processes determine a longitudinal velocity for the first object that is substantially the same as a longitudinal velocity for the second object;
- the object detection and tracking processes produce a radar track and a camera track for the second object; and
- the first object is located longitudinally in front of the second object within a set distance corresponding to a maximum length of a long vehicle.

When the conditions are assessed to be true, the second object is used as an input for controlling an active safety feature of the vehicle 10 in step 640 implemented by the active safety feature control module 206. The first object is discounted as an input for controlling the active safety feature of the vehicle 10. When at least one of the applied conditions is assessed to be false in step 630, the first and second objects are used as an input for controlling the active safety feature of the vehicle 10. That is, the active safety feature is responsive to the tracks associated with the first and the second objects when one of the conditions are false, whereas when each of the conditions are true, the active safety feature is responsive only to the track (or tracks) associated with the second object The active safety feature can include steering, braking or propulsion changes, e.g. to avoid a collision, and can be executed by a fully or semi-autonomous vehicle. The active safety feature can include a change in motion of the vehicle in response to an object being predicted by the at least one processor to interfere with a path of the vehicle, e.g. to avoid a predicted collision.

Disclosed herein are methods and systems that allow errantly reported detected radar objects at the front of large vehicles to be identified by a triage of assessments using existing data points reported by object detection and tracking processes. By doing so, it can be avoided that such errant detections result in unintended braking situations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling an active safety feature of a vehicle, the method comprising:
   receiving, via at least one processor, radar data from a radar device of the vehicle;
   receiving, via the at least one processor, image data from a camera of the vehicle;
   performing, via the at least one processor, object detection and tracking processes on the radar data to generate a first radar detected object track associated with a first detected object and a second radar detected object track associated with a second detected object;
   making a first determination, via the at least one processor, regarding whether object detection and tracking processes on the image data generates a first camera detected object track associated with the first detected object;
   performing, via the at least one processor, the object detection and tracking processes on the image data to generate a second camera detected object track associated with the second detected object;
   making a second determination, via the at least one processor, regarding whether the first detected object is located longitudinally in front of the second detected object by a substantially constant distance; and in response to the first determination, via the at least one processor, that the object detection and tracking processes on the image data does not generate the first camera detected object track associated with the first detected object and the second determination, via the at least one processor, that the first detected object is located longitudinally in front of the second detected object by the substantially constant distance:

generating, via the at least one processor, an assessment result that the first detected object and the second detected object are part of a single object; and using, via the at least one processor, the second detected object as an input for controlling the active safety feature of the vehicle and not using the first detected object as an input for controlling the active safety feature of the vehicle.

2. The method of claim 1, further comprising:

making a third determination, via the at least one processor, regarding whether the object detection and tracking processes have classified the second detected object as a large vehicle type; and in response to the third determination, via the at least one processor, that the object detection and tracking the object detection and tracking processes have classified the second detected object as the large vehicle type, generating via the at least one processor, the assessment result that the first detected object and the second detected object are part of the single object.

3. The method of claim 1, further comprising:

making a fourth determination, via the at least one processor, regarding whether the object detection and tracking processes have identified the second detected object as having a specified minimum width; and in response to the fourth determination, via the at least one processor, that the object detection and tracking processes have identified the second detected object as having the specified minimum width, generating via the at least one processor, the assessment result that the first detected object and the second detected object are part of the single object.

4. The method of claim 1, further comprising:

making a fifth determination, via the at least one processor, regarding whether the object detection and tracking processes have determined a longitudinal velocity for the first detected object to be substantially the same as a longitudinal velocity for the second detected object; and in response to the fifth determination, via the at least one processor, that the object detection and tracking processes has determined the longitudinal velocity for the first detected object as being substantially the same as the longitudinal velocity for the second detected object, generating via the at least one processor, the assessment result that the first detected object and the second detected object are part of the single object.

5. The method of claim 1, wherein the substantially constant distance is a set distance.

6. The method of claim 1, wherein the object detection and tracking processes include object detecting using a deep learning algorithm.

7. The method of claim 1, wherein the active safety feature includes change in motion of the vehicle in response to the single object being predicted by the at least one processor to interfere with a path of the vehicle.

8. The method of claim 7, wherein the change in motion is affected by braking, steering or propulsion control.

9. The method of claim 1, wherein the camera and the radar device are forward facing.

10. The method of claim 1, wherein:

each of the first radar detected object track, the second radar detected object track, and the second camera detected object track for the associated one of the first detected object and the second detected object connects a plurality of states of the associated one of the first detected object and the second detected object at different previous time steps, each of the plurality of states of the associated one of the first detected object and the second detected object is represented by a state variable including a position vector and a velocity vector, and the state variables of the plurality of states associated with the one of the first detected object and the second detected object at the different previous time steps are used to predict future states of the one of the first detected object and the second detected object.

11. A vehicle comprising:

an active safety system comprising an active safety feature;

a radar device;

a camera; and at least one processor in operable communication with the active safety system, the radar device and the camera, wherein the at least one processor is configured to execute program instructions, wherein the program instructions are configured to cause the at least one processor to:

receive radar data from the radar device of the vehicle;

receive image data from the camera of the vehicle;

perform object detection and tracking processes on the radar data to generate a first radar detected object track associated with a first detected object and a second radar detected object track associated with a second detected object;

make a first determination regarding whether object detection and tracking processes on the image data generates a first camera detected object track associated with the first detected object;

perform the object detection and tracking processes on the image data to generate a second camera detected object track associated with the second detected object;

make a second determination regarding whether the first detected object is located longitudinally in front of the second detected object by a substantially constant distance; and in response to the first determination that the object detection and tracking processes on the image data does not generate the first camera detected object track associated with the first detected object and the second determination that the first detected object is located longitudinally in front of the second detected object by the substantially constant distance:

generate an assessment result that the first detected object and the second detected object are part of a single object; and use the second detected object as an input for controlling the active safety feature of the vehicle and not use the first detected object as an input for controlling the active safety feature of the vehicle.

12. The vehicle of claim 11, wherein the program instructions are configured to cause the at least one processor to:

make a third determination regarding whether the object detection and tracking processes have classified the second detected object as a large vehicle type; and in response to the third determination that the object detection and tracking processes have classified the second detected object as the large vehicle type, generate the assessment result that the first detected object and the second detected object are part of the single object.

13. The vehicle of claim 11, wherein the program instructions are configured to cause the at least one processor to:

make a fourth determination regarding whether the object detection and tracking processes have identified the second detected object as having a specified minimum width; and in response to the fourth determination that the object detection and tracking processes have identified the second detected object as having the specified minimum width, generate the assessment result that the first detected object and the second detected object are part of the single object.

14. The vehicle of claim 11, wherein the program instructions are configured to cause the at least one processor to:

make a fifth determination regarding whether the object detection and tracking processes has determined a longitudinal velocity for the first detected object to be substantially the same as a longitudinal velocity for the second detected object; and in response to the fifth determination that the object detection and tracking processes has determined the longitudinal velocity for the first detected object to be substantially the same as the longitudinal velocity for the second detected object, generate the assessment result that the first detected object and the second detected object are part of the single object.

15. The vehicle of claim 11, wherein the substantially constant distance is a set distance.

16. The vehicle of claim 11, wherein the object detection and tracking processes include object detecting using a deep learning algorithm.

17. The vehicle of claim 11, wherein the active safety feature includes change in motion of the vehicle in response to the single object being predicted by the at least one processor to interfere with a path of the vehicle.

18. The vehicle of claim 17, wherein the change in motion is affected by braking, steering or propulsion control.

19. The vehicle of claim 11, wherein the camera and the radar device are forward facing.

20. The vehicle of claim 11, wherein:

each of the first radar detected object track, the second radar detected object track, and the second camera detected object track for the associated one of the first detected object and the second detected object connects a plurality of states of the associated one of the first detected object and the second detected object at different previous time steps, each of the plurality of states of the associated one of the first detected object and the second detected object is represented by a state variable including a position vector and a velocity vector, and the state variables of the plurality of states associated with the one of the first detected object and the second detected object at the different previous time steps are used to predict future states of the one of the first detected object and the second detected object.

* * * * *